(12) United States Patent
Umeno

(10) Patent No.: US 7,471,714 B2
(45) Date of Patent: Dec. 30, 2008

(54) RANDOM NUMBER SEQUENCE SHARING SYSTEM, RANDOM NUMBER SEQUENCE SHARING APPARATUS, CODEC SYSTEM, CODING APPARATUS, DECODING APPARATUS, RANDOM NUMBER SEQUENCE SHARING METHOD, CODING METHOD, DECODING METHOD, AND PROGRAM PRODUCT

(75) Inventor: Ken Umeno, Tokyo (JP)

(73) Assignee: National Institute of Information and Communication Technology, Incorporated Administrative Agenvy, Tokyo (JP)

(*) Notice: Subject to any disclaimer, the term of this patent is extended or adjusted under 35 U.S.C. 154(b) by 528 days.

(21) Appl. No.: 11/081,227

(22) Filed: Mar. 15, 2005

(65) Prior Publication Data
US 2005/0242987 A1 Nov. 3, 2005

(30) Foreign Application Priority Data
Mar. 31, 2004 (JP) .............................. 2004-102612

(51) Int. Cl.
*H04B 1/00* (2006.01)
(52) U.S. Cl. .................... 375/140; 375/140; 375/130; 380/258; 380/259; 380/206; 713/161; 713/168
(58) Field of Classification Search ................... None
See application file for complete search history.

(56) References Cited

U.S. PATENT DOCUMENTS

| | | | | |
|---|---|---|---|---|
| 4,684,955 A | * | 8/1987 | Adams et al. | 342/351 |
| 5,124,117 A | * | 6/1992 | Tatebayashi et al. | 380/281 |
| 5,852,630 A | * | 12/1998 | Langberg et al. | 375/219 |
| 6,298,153 B1 | * | 10/2001 | Oishi | 382/186 |
| 7,126,535 B2 | * | 10/2006 | Jenkins et al. | 342/463 |
| 7,197,142 B2 | * | 3/2007 | Alten | 380/46 |
| 7,197,381 B2 | * | 3/2007 | Sheikh et al. | 701/13 |
| 7,237,110 B2 | * | 6/2007 | Takahashi et al. | 713/168 |
| 7,260,222 B2 | * | 8/2007 | Ishizuka et al. | 380/255 |

FOREIGN PATENT DOCUMENTS

| | | |
|---|---|---|
| JP | 11-243313 | 9/1998 |
| JP | 2000-278259 | 10/2000 |
| JP | 2001-308845 | 11/2001 |
| JP | 2003-218866 | 7/2003 |

* cited by examiner

*Primary Examiner*—Shuwang Liu
*Assistant Examiner*—Kenneth Lam
(74) *Attorney, Agent, or Firm*—Townsend and Townsend and Crew LLP

(57) ABSTRACT

In a random number sequence sharing apparatus, a reception unit receives a radio signal including a radio wave from a pre-designated radio star at a pre-designated observation time, a sending unit sends the received radio signal to another random number sequence sharing apparatus, an acceptance unit accepts a radio signal sent from the another sharing apparatus, an analysis unit separates the two radio signals into a plurality of independent components by independent component analysis, a selection unit selects two independent components temporally different by difference in time required for the radio wave to arrive at both sharing apparatuses from the radio star, a sampling unit averages the two selected independent components after adjusting the temporal difference and bit-samples the average, and an output unit outputs a sequence of the bit samples as a random number sequence to be shared.

20 Claims, 4 Drawing Sheets

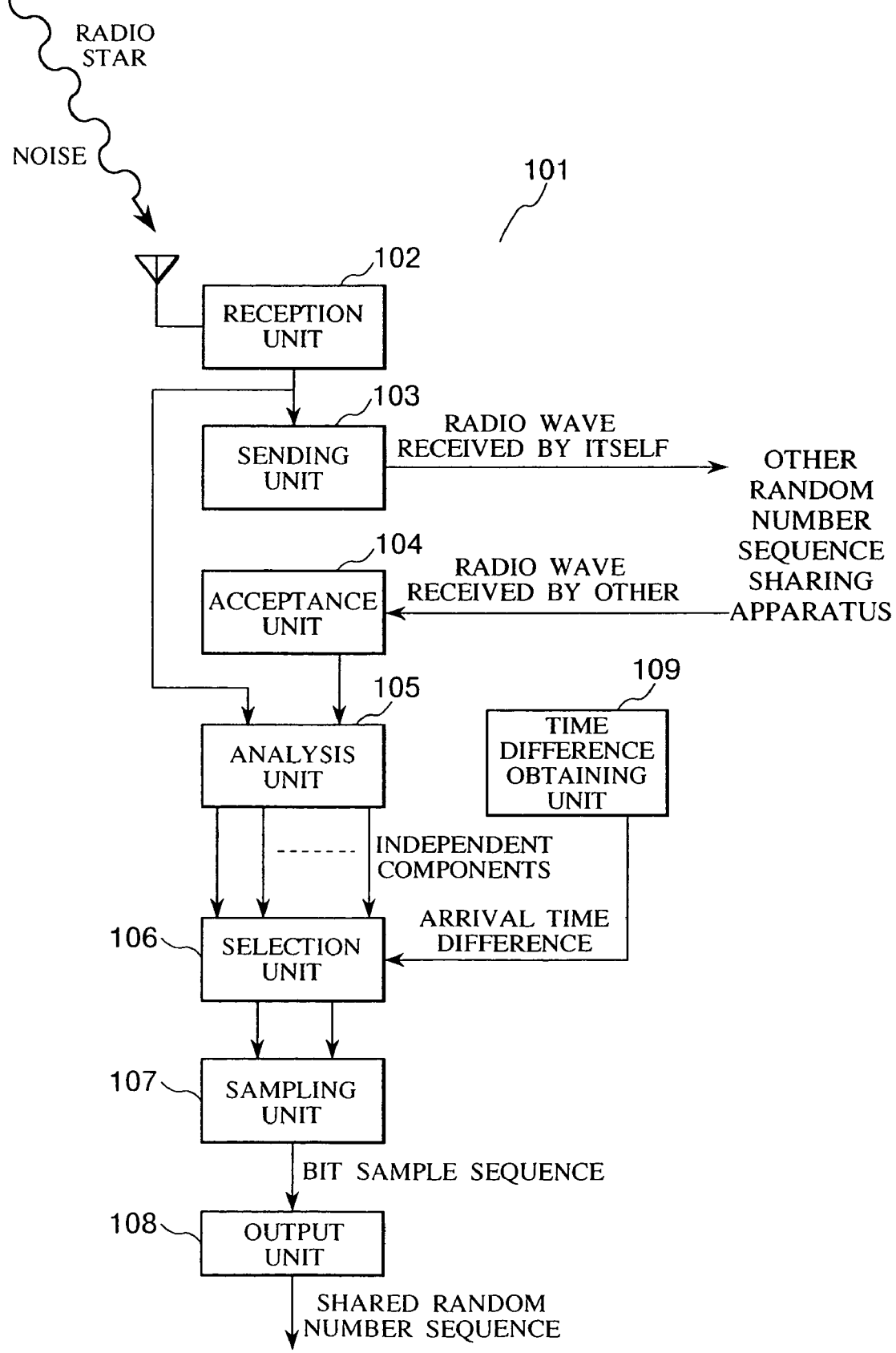

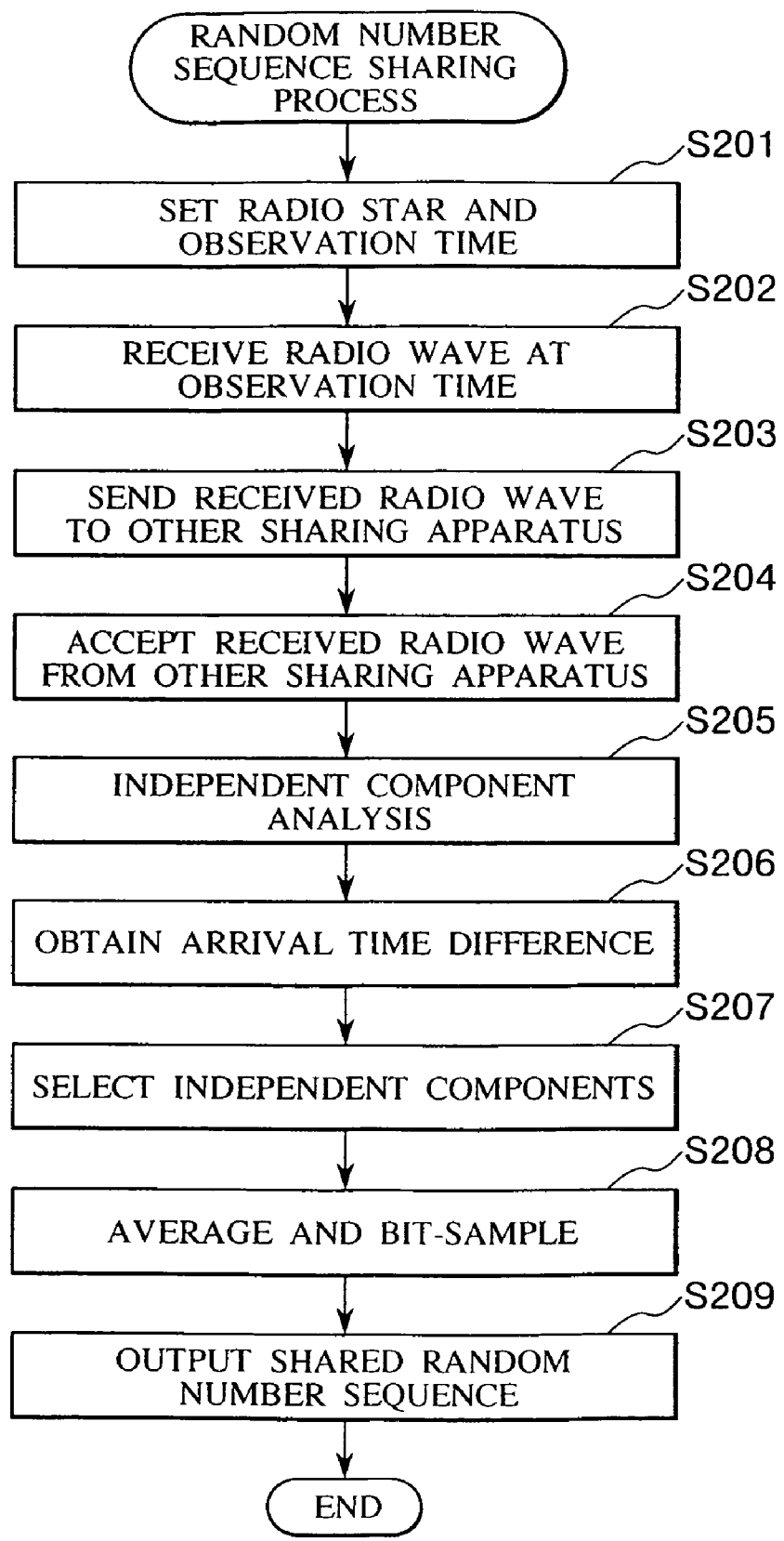

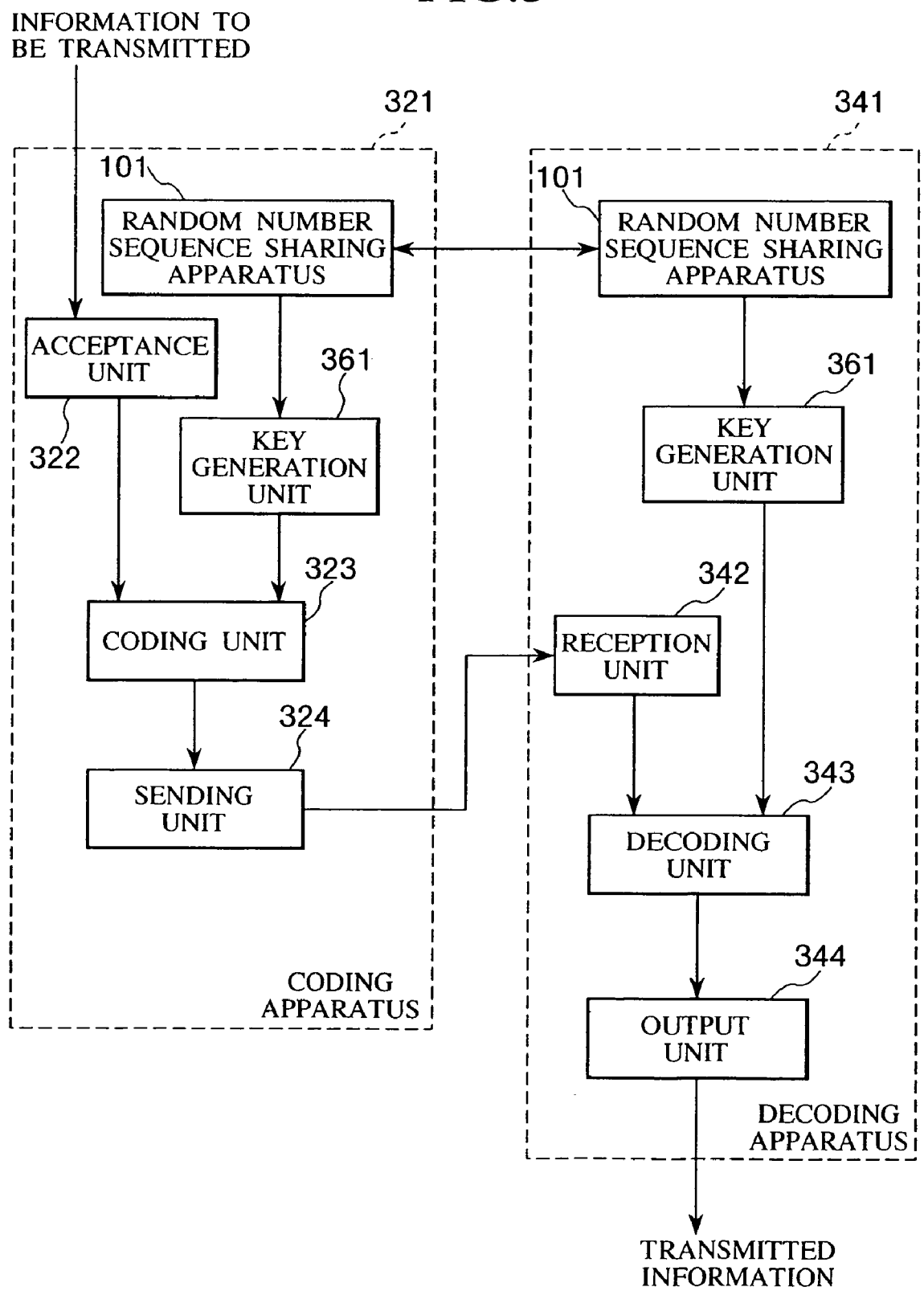

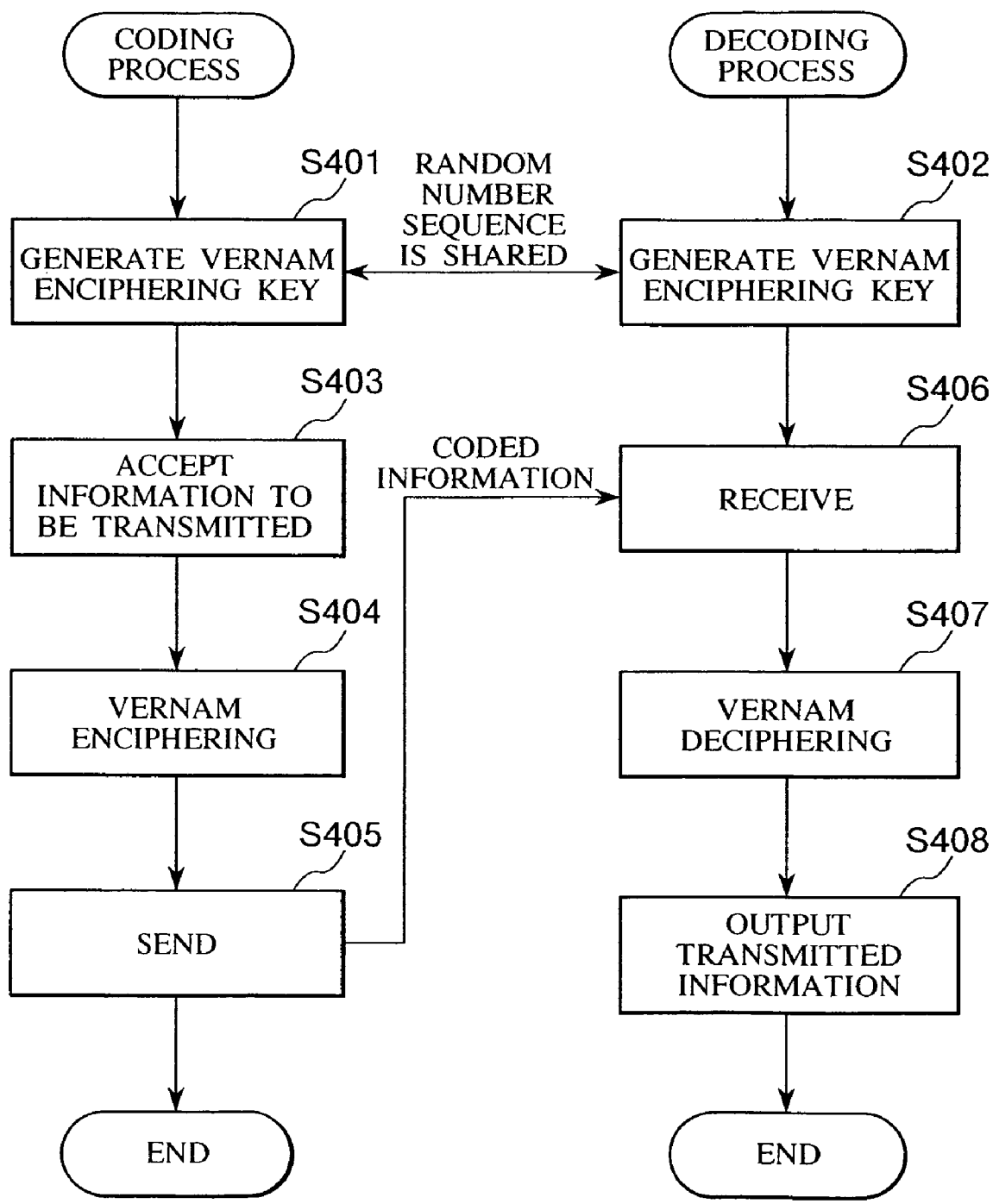

RANDOM NUMBER SEQUENCE SHARING SYSTEM, RANDOM NUMBER SEQUENCE SHARING APPARATUS, CODEC SYSTEM, CODING APPARATUS, DECODING APPARATUS, RANDOM NUMBER SEQUENCE SHARING METHOD, CODING METHOD, DECODING METHOD, AND PROGRAM PRODUCT

CROSS-REFERENCES TO RELATED APPLICATIONS

This application is based on Japanese Patent Application No. 2004-102612 filed on Mar. 31, 2004 and including specification, claims, drawings and summary. The disclosure of the above Japanese Patent Application is incorporated herein by reference in its entirety.

BACKGROUND OF THE INVENTION

The present invention relates to a random number sequence sharing system, random number sequence sharing apparatus, codec system, coding apparatus, decoding apparatus, random number sequence sharing method, coding method, and decoding method utilizing a radio wave emitted from a radio star, and a program for realizing these on a computer.

Conventionally, in the field of information communication technologies, researches have been made into authentication technologies for checking message generators or message senders. Currently, signature authentication systems or coded communication systems utilizing public key coding are becoming popular.

Meanwhile, attempts are made to receive a radio wave emitted from radio stars such as quasi-stellar objects (quasars), maser sources (including water maser sources, ammonia maser sources, and methanol maser sources), etc. by VLBI (Very Long Baseline Interferometry), and utilize the received radio wave in various technological fields. Particularly, a signal received by VLBI has an ideal perfect randomness, and a radio wave from a radio star can be received at any geographical point on the earth (or depending on the kind of a radio star, at any geographical point existing on the surface, of the earth's ground surface, that faces this radio star).

Therefore, technologies for measuring a relative positional relation between a point and another point on the earth by utilizing VLBI are put into practical use.

The inventors of the present invention have already proposed an authentication system, etc. utilizing a radio star, in view of demands in the field of information communication, for authentication technologies ensuring higher security that can prevent "pretending".

Other than the proposal by the inventors, the following documents can be raised as prior art documents.

[Patent Document 1] Unexamined Japanese Patent Application KOKAI Publication No. 2003-218866

[Patent Document 2] Unexamined Japanese Patent Application KOKAI Publication No. 2001-308845

[Patent Document 3] Unexamined Japanese Patent Application KOKAI Publication No. 2000-278259

[Patent Document 4] Unexamined Japanese Patent Application KOKAI Publication No. H11-243313

[Patent Document 1] discloses an authentication system, etc. similar to that disclosed by the inventors. That is, the document discloses a technique in which an authentication apparatus and an authentication target apparatus observe a radio wave from the same radio star at the same observation time, estimate the position of the other apparatus based on the information on the radio wave observed by the other, and authenticate the other as valid in a case where the estimated position and a pre-stored position correspond to each other within a predetermined error range.

[Patent Document 2] discloses a coding technique utilizing stream cipher, which is hard to decipher. That is, a random number sequence is generated based on a given multiple affine key, and the clear text is coded by the exclusive OR of the generated random number sequence and the clear text. The multiple affine key is automatically and sequentially rewritten into a new sequence of multiple affine key, after the multiple affine key is used each predetermined number of times. A random number sequence is newly generated based on the new sequence of multiple affine key, and the clear text after the rewriting of the key is coded by using the newly generated random number sequence.

[Patent Document 3] discloses a data distribution system which distributes sophisticated data to a specific user. That is, a coding process unit reads out distribution target data stored in a data storage unit, affixes a secret key read from a secret key writing process unit to the data, and codes the data by using another secret key read from the secret key writing process unit, while a decoding process unit decodes received data which is coded, by using a secret key which is affixed to previously received data and retained in a secret key retention unit.

[Patent Document 4] discloses a technique for a radio telescope, whose technique relates to relative VLBI for measuring the position of an observation target astronomical object, as a value relative to a reference astronomical object whose position is already known. That is, this technique allows only one antenna to conduct relative VLBI observation, by using a radio telescope capable of relative VLBI observation, to track an astronomical object correspondingly to the earth's rotation on its axis, while at the same time to track an observation target astronomical object for a predetermined time, then quickly change the tracking direction to track the astronomical object for a predetermined time, and again quickly change the tracking direction to track the observation target astronomical object and repeat this operation.

In the field of information communication utilizing coding, there is a strong demand for a technique that allows the coder side and the decoder side to safely share a random number sequence and perform coding and decoding by using this random number sequence.

The present invention is intended for solving the above-described problem, and an object of the present invention is to provide a random number sequence sharing system, random number sequence sharing apparatus, codec system, coding apparatus, decoding apparatus, random number sequence sharing method, coding method, and decoding method utilizing a radio wave emitted from a radio star, and a program for realizing these on a computer.

BRIEF SUMMARY OF THE INVENTION

To achieve the above object, the following invention will be disclosed in accordance with the principle of the present invention.

A random number sequence sharing system according to a first aspect of the present invention has a plurality of random number sequence sharing apparatuses, and each of the random number sequence sharing apparatuses comprises a reception unit, a sending unit, an acceptance unit, an analysis unit, a selection unit, a sampling unit, and an output unit, each of which is configured as follows.

The reception unit receives a radio signal including a radio wave radiated from a pre-designated radio star, at a pre-designated observation time.

The sending unit sends the received radio signal to another random number sequence sharing apparatus.

The acceptance unit accepts a radio signal sent from the another random number sequence sharing apparatus.

The analysis unit separates the received radio signal and the accepted radio signal into a plurality of independent components according to independent component analysis.

The selection unit selects from the plurality of independent components obtained by the independent component analysis, two independent components which are temporally different from each other by an arrival time difference between an arrival time it takes for the radio wave radiated from the radio star to arrive at the random number sequence sharing apparatus and an arrival time it takes for the radio wave to arrive at the another random number sequence sharing apparatus.

The sampling unit bit-samples an average of a component obtained by delaying one of the two selected independent component that is temporally anterior by the arrival time difference and the selected independent component that is temporally posterior, with a predetermined precision.

The output unit outputs a sequence of bit samples obtained by the bit-sampling, as a random number sequence to be shared with the another random number sequence sharing apparatus.

In the random number sequence sharing system according to the present invention, each of the plurality of random number sequence sharing apparatuses may further comprise a time difference obtaining unit, and the time difference obtaining unit may obtain the arrival time difference based on locations at which the plurality of random number sequence sharing apparatuses are installed, a location of the pre-designated radio star, and the pre-designated observation time.

In the random number sequence sharing system according to the present invention, the sampling unit may bit-sample "one of the two selected independent components that is temporally anterior" instead of "the average of a component obtained by delaying one of the two selected independent component that is temporally anterior by the arrival time difference and the selected independent component that is temporally posterior", with a predetermined precision.

In the random number sequence sharing system according to the present invention, the sampling unit may bit-sample "one of the two selected independent components that is temporally posterior" instead of "the average of a component obtained by delaying one of the two selected independent component that is temporally anterior by the arrival time difference and the selected independent component that is temporally posterior", with a predetermined precision.

In the random number sequence sharing system according to the present invention, the average bit-sampled by the sampling unit may be a weighted average.

A random number sequence sharing apparatus according to another aspect of the present invention is the random number sequence sharing apparatus in the above-described random number sequence sharing system.

A codec system according to another aspect of the present invention comprises a coding apparatus and a decoding apparatus which share a sampling rule with each other, and is configured as follows.

Each of the coding apparatus and the decoding apparatus includes a random number sequence sharing apparatus which constitutes the random number sequence sharing system described above.

The coding apparatus comprises a key generation unit, an acceptance unit, a coding unit, and a sending unit, which are configured as follows.

The key generation unit selects a number sequence from a random number sequence output from the random number sequence sharing apparatus included in the coding apparatus according to the sampling rule, and uses the selected number sequence as a Vernam enciphering key.

The acceptance unit accepts information to be transmitted to the decoding apparatus.

The coding unit codes the accepted information according to a Vernam enciphering manner by using the generated Vernam enciphering key.

The sending unit sends the coded information to the decoding apparatus.

The decoding apparatus comprises a key generation unit, a reception unit, a decoding unit, and an output unit, which are configured as follows.

The key generation unit selects a number sequence from a random number sequence output from the random number sequence sharing apparatus included in the decoding apparatus according to the sampling rule, and uses the selected number sequence as a Vernam enciphering key.

The reception unit receives the coded information sent from the coding apparatus.

The decoding unit decodes the received information according to a Vernam deciphering manner by using the generated Vernam enciphering key.

The output unit outputs the decoded information as information transmitted from the coding apparatus.

The random number sequence sharing apparatus included in the coding apparatus and the random number sequence sharing apparatus included in the decoding apparatus constitute the random number sequence sharing system described above.

In the codec system according to the present invention, each of the coding apparatus and the decoding apparatus may further comprise a rule acceptance unit, and the rule acceptance unit may accept an input of a sampling rule to be shared.

A coding apparatus according to another aspect of the present invention is the coding apparatus in the codec system described above.

A decoding apparatus according to another aspect of the present invention is the decoding apparatus in the codec system described above.

A random number sequence sharing method according to another aspect of the present invention comprises a receiving step, a sending step, an accepting step, an analyzing step, a selecting step, a sampling step, and an outputting step, and is configured as follows.

In the receiving step, a radio signal including a radio wave radiated from a pre-designated radio star is received by a random number sequence sharing apparatus, at a pre-designated observation time.

In the sending step, the received radio signal is sent to another random number sequence sharing apparatus.

In the accepting step, a radio signal sent from the another random number sequence sharing apparatus is accepted.

In the analyzing step, the received radio signal and the accepted radio signal are separated into a plurality of independent components according to independent component analysis.

In the selecting step, two independent components which are temporally different from each other by an arrival time difference between an arrival time it takes for the radio wave radiated from the radio star to arrive at the random number sequence sharing apparatus and an arrival time it takes for the radio wave to arrive at the another random number sequence sharing apparatus are selected from the plurality of independent components obtained by the independent component analysis.

In the sampling step, an average of a component obtained by delaying one of the two selected independent components that is temporally anterior by the arrival time difference and the selected independent component that is temporally posterior is bit-sampled with a predetermined precision.

In the outputting step, a sequence of bit samples obtained by the bit-sampling is output as a random number sequence to be shared with the another random number sequence sharing apparatus.

The random number sequence sharing method according to the present invention may further comprise a time difference obtaining step. In the time difference obtaining step, the arrival time difference is obtained based on a location at which the another random number sequence sharing apparatus is installed, a location of the pre-designated radio star, and the pre-designated observation time.

In the random number sequence sharing method according to the present invention, in the sampling step, "one of the two selected independent components that is temporally anterior" may be bit-sampled instead of "the average of a component obtained by delaying one of the two selected independent component that is temporally anterior by the arrival time difference and the selected independent component that is temporally posterior", with a predetermined precision.

In the random number sequence sharing method according to the present invention, in the sampling step, "one of the two selected independent components that is temporally posterior" may be bit-sampled instead of "the average of a component obtained by delaying one of the two selected independent component that is temporally anterior by the arrival time difference and the selected independent component that is temporally posterior", with a predetermined precision.

A coding method according to another aspect of the present invention comprises a key generating step, an accepting step, a coding step, and a sending step, and is configured as follows.

In the key generating step, a number sequence is selected according to a sampling rule, from a random number sequence output in accordance with the random number sequence sharing method described above, and the selected number sequence is used as a Vernam enciphering key.

In the accepting step, information to be transmitted to a decoding apparatus is accepted.

In the coding step, the accepted information is coded according to a Vernam enciphering manner by using the generated Vernam enciphering key.

In the sending step, the coded information is sent to the decoding apparatus.

The coding method according to the present invention may further comprise a rule accepting step, and in the rule accepting step, an input of a sampling rule to be shared is accepted.

A decoding method according to another aspect of the present invention comprises a key generating step, a receiving step, a decoding step, and an outputting step, and is configured as follows.

In the key generating step, a number sequence is selected according to a sampling rule, from a random number sequence output in accordance with the random number sequence sharing method described above, and the selected number sequence is used as a Vernam enciphering key.

In the receiving step, coded information sent from a coding apparatus is received.

In the decoding step, the received information is decoded according to a Vernam deciphering manner by using the generated Vernam enciphering key.

In the outputting step, the decoded information is output as information transmitted from the coding apparatus.

The decoding method according to the present invention may further comprise a rule accepting step, and in the rule accepting step, an input of a sampling rule to be shared is accepted.

A program according to another aspect of the present invention controls a computer to function as the random number sequence sharing apparatus, the coding apparatus, or the decoding apparatus described above, and controls a computer to perform the random number sequence sharing method, the coding method, or the decoding method described above.

A computer-readable information recording medium (including a compact disk, a flexible disk, a hard disk, a magneto-optical disk, a digital video disk, a magnetic tap, and a semiconductor memory) is configured to store the above-described program.

This information recording medium may be distributed or sold independently from a computer, or the program itself may be distributed or sold through a computer communication network such as the Internet.

According to the present invention, it is possible to provide a random number sequence sharing system, a random number sequence sharing apparatus, a codec system, a coding apparatus, a decoding apparatus, a random number sequence sharing method, a coding method, and a decoding method which utilize a radio wave radiated from a radio star, and a program for realizing these on a computer.

BRIEF DESCRIPTION OF THE DRAWINGS

These objects and other objects and advantages of the present invention will become more apparent upon reading of the following detailed description and the accompanying drawings in which:

FIG. 1 is an exemplary diagram showing a schematic structure of a random number sequence sharing apparatus according to an embodiment of the present invention;

FIG. 2 is a flowchart showing a flow of control for a random number sequence sharing process according to an embodiment of the present invention;

FIG. 3 is an exemplary diagram showing a schematic structure of a codec system according to an embodiment of the present invention; and FIG. 4 is a flowchart showing a flow of control for a coding process performed by a coding apparatus and a decoding process performed by a decoding apparatus in the codec system according to the embodiment of the present invention.

DETAILED DESCRIPTION OF THE INVENTION

The embodiment of the present invention will now be explained. The embodiment to be described below is intended for explanation, and is not to limit the scope of the present invention. Those skilled in the art could employ an embodiment in which some or all of the elements of the present embodiment are replaced with equivalents of those. However, such an embodiment will be regarded to be included in the scope of the present invention.

EMBODIMENT 1

A method for sharing a random number sequence will now be explained. A random number sequence sharing system according to the present embodiment comprises a plurality of random number sequence sharing apparatuses. These random number sequence sharing apparatuses have the same configuration.

FIG. 1 is an exemplary diagram showing a schematic configuration of the random number sequence sharing apparatus according to the present embodiment. FIG. 2 is a flowchart showing the flow of control for a random number sequence sharing process performed by the random number sequence sharing apparatus. The following explanation will be made with reference to these drawings.

The random number sequence sharing apparatus 101 comprises a reception unit 102, a sending unit 103, an acceptance unit 104, an analysis unit 105, a selection unit 106, a sampling unit 107, an output unit 108, and a time difference obtaining unit 109.

First, the random number sequence sharing apparatus 101 determines which of the other random number sequence sharing apparatuses 101 to share random numbers with, and sets a radio star (or the location thereof) to be used and an observation time (step S201).

An arbitrary time can be selected as the observation time as long as it is such a time at which both of the random number sequence sharing apparatuses 101 can observe a radio wave from the radio star, after the current time.

A maser source (including water maser source, ammonia maser source, and methanol maser source), or a quasi-stellar object (quasar) can be designated as the radio star. The number of radio stars to be set for observation is not limited to one, but may be a plural number. In this case, radio stars that can be observed by both of the random number sequence sharing apparatuses 101 at the set observation time should be selected.

As will be described later, the radio star and observation time set in step S201 function as one of "random number seeds" when a random number sequence is shared.

The reception unit 102 receives a radio signal including a radio wave radiated from the set radio star at the set observation time (step S202). A general interstellar radio wave reception technology can be applied to the reception of a radio wave from the radio star.

The sending unit 103 sends the received radio signal to the other random number sequence sharing apparatus 101 (step S203), and the acceptance unit 104 accepts the radio signal sent from the other random number sequence sharing apparatus 101 (step S204). As a result, both of the random number sequence sharing apparatuses 101 share the radio signal received by the other. The radio signals may be sent and accepted by means of various communication techniques, for example, through utilization of an ordinary computer communication network.

The analysis unit 105 separates the received radio signal and accepted radio signal into a plurality of independent components by means of independent component analysis (step S205).

Independent component analysis is one method for analyzing multidimensional signals, and is used for finding transformation for separating target signals according to their independency based on their statistic in a high dimension or their temporal correlation. Publicly known techniques can be used for deriving such a matrix.

Independent component analysis is applied to the fields of BSS (Blind Source Separation) and BSD (Blind Source Deconvolution), with only an assumption that the signal sources of the target signals are independent. As achievements of these fields, there are techniques for distinguishing voices of different speakers input to a plurality of microphones, and techniques for distinguishing brain waves from electric signals detected at various points on the head.

As the result of independent component analysis, a component contained in the radio wave radiated from the set radio star and received by one sharing apparatus, a component contained in the radio wave radiated from the set radio star and received by the other sharing apparatus, components contained in radio waves radiated from other radio stars, and components in various noise radio waves can be separated from one another.

According to the basic technique of independent component analysis, it is often the case that M number of independent components (in the present embodiment, these components correspond to the components received by one and the other sharing apparatuses from the radio waves from the set radio star) are obtained from M number of signals (in the present embodiment, these signals correspond to the two received signals). However, in a case where some separated signal components are correlated, this technique can estimate N number of independent components from M number of signals (N>M). In the present embodiment, such a technique is employed.

Next, the time difference obtaining unit 109 obtains the difference in arrival time (arrival time difference), based on the locations at which the plurality of random number sequence sharing apparatuses 101 are installed, the location of the radio star that is set earlier, and the observation time that is set earlier (step S206).

The selection unit 106 selects two independent components which are temporally different from each other by the obtained arrival time difference, from the plurality of independent components obtained by independent component analysis (step S207).

Since the reception unit 102 is meant to receive a radio wave from the set radio star as described above, it is expected that the radio wave from the set radio star can be received at a certain level of large electric power. Therefore, if a plurality of independent components are obtained after the analysis, it is expected that two independent components, one being the component received by one sharing apparatus from the radio wave radiated from the set radio star and the other being the component received by the other sharing apparatus from the radio wave radiated from the set radio star, can be obtained in most cases.

In a case where two independent component satisfying the above condition can not be selected in step S207, it means that sharing of a random number sequence is unsuccessful. In this case, this fact is reported and the random number sequence sharing process is ended (not shown).

The sampling unit 107 bit-samples the average of a component which is obtained by delaying one of the two selected independent components that is temporally anterior by the arrival time difference, and the component that is temporally posterior, with a predetermined precision (step S208). The average may be a weighted average. Furthermore, in a case where one or the other of the two is selected as the weight, not the "average" but "one of the two selected independent components that is temporally anterior" or "one of the two selected independent components that is temporally posterior" may be bit-sampled.

If the component that is temporally anterior is delayed by the arrival time difference, there is no temporal difference between this component and the component that is temporally posterior. Therefore, if the average of the two is taken, the time series of the components can be obtained. Therefore, if this time series is bit-sampled with a desired precision, a random number sequence can be obtained.

Lastly, the output unit 108 outputs the sampled bit-sample sequence as a random number sequence shared with the other random number sequence sharing apparatus (step S209), and the random number sequence sharing process is thus ended.

The present invention is based on a hypothesis in radio astronomy that "a radio wave radiated from a radio star which is several billion light years away is random". It is possible to obtain a random number sequence that can be used as a public key in a codec system, by eliminating various noise radio wave components using independent component analysis and by sharing signals from the random signal source (radio star) between the two random number sequence sharing apparatuses 101.

(Codec System)

FIG. 3 is an exemplary diagram showing a schematic structure of a codec system utilizing the above-described random number sequence sharing apparatus 101. FIG. 4 is a flowchart showing the flow of control for a coding process and decoding process respectively performed by a coding apparatus and decoding apparatus in the present codec system. The following explanation will be made with reference to these diagrams.

A codec system 301 according to the present embodiment comprises a coding apparatus 321 and a decoding apparatus 341 both of which includes the random number sequence sharing apparatus 101.

The present embodiment employs Vernam enciphering. According to Vernam enciphering, a bit sequence is obtained by selecting and extracting a plurality of bits from bits contained in a shared random number sequence according to a sampling rule set in advance (or made open in advance), and the obtained bit sequence is used as the code key. As well known, Vernam enciphering realizes a completely safe system unless the shared random number sequence itself is known to eavesdroppers, as will be described later.

The coding apparatus 321 comprises a key generation unit 361, an acceptance unit 322, a coding unit 323, and a sending unit 324.

The decoding apparatus 341 comprises a key generation unit 361, a reception unit 342, a decoding unit 343, and an output unit 344.

In the coding apparatus 321, the key generation unit 361 selects a number sequence from the random number sequence output from the random number sequence sharing apparatus 101 included in the coding apparatus 321 according to the sampling rule, and uses the selected number sequence as the Vernam enciphering key (step S401).

Likewise, in the decoding apparatus 341, the key generation unit 361 selects a number sequence from the random number sequence output from the random number sequence sharing apparatus 101 included in the decoding apparatus 341 according to the sampling rule, and uses the selected number sequence as the Vernam enciphering key (step S402). Since the random number sequence sharing apparatus 101 included in the coding apparatus 321 and the random number sequence sharing apparatus 101 included in the decoding apparatus 341 constitute a random number sequence sharing system, the Vernam enciphering keys obtained by them are the same. That is, a common key is shared between them safely.

In the coding apparatus 321, the acceptance unit 322 accepts information to be transmitted to the decoding apparatus (step S403). The coding unit 323 codes the accepted information according to the Vernam enciphering manner by using the generated Vernam enciphering key (step S404). The sending unit 324 sends the coded information to the decoding apparatus 341 (step S405).

On the other hand, in the decoding apparatus 341, the reception unit 342 receives the coded information sent from the coding apparatus 321 (step S406). The decoding unit 343 decodes the received information according to the Vernam deciphering manner by using the generated Vernam enciphering key (step S407). The output unit 344 outputs the decoded information as information transmitted from the coding apparatus 321 (step S408).

In the present embodiment, the coding apparatus 321 and the decoding apparatus 341 may both further comprise a rule acceptance unit (not shown), which accepts input of a sampling rule to be shared selected from a plurality of sampling rules prepared in advance.

According to Vernam enciphering, the same open file constituted by a binary random number series $B^J$ having a length of J bits can be used at the coder side and the decoder side. The random number series $B^J$ is generally different from a sequence that is output from the random number sequence sharing apparatus 101, and is prepared in advance. The value J is sufficiently large and the random number series $B^J$ is a true random number series.

An enciphering key is generated by sampling each bit $K_p$ of a random number sequence $K=K_1K_2\ldots$ output from the random number sequence sharing apparatus 101 (this random number sequence is called "key sequence for Vernam enciphering") from the open file code $B^J$ in accordance with a certain sampling rule $F_\alpha(p)$. The value a is a parameter for determining a sampling rule. In a case where the size of $\alpha$ is L bit, this represents that there are $2^L$ number of sampling rules.

According to the theory of Vernam enciphering, a completely safe system can be realized unless the content of K is known to eavesdroppers. Any eavesdropper who does not know a has to try all of the sampling rules $F_\alpha(p)$ in order to obtain K.

If it is assumed that L=100, there are $2^{100} \approx 10^{33}$ kinds of sampling rules. If it is assumed that it takes an eavesdropper $10^{-10}$ second to get 1-bit $K_p$ from the open file by calculating $F_\alpha(p)$ once, it takes at least $10^{-10}$ second to determine whether or not the rule $F_\alpha(p)$ is the sampling rule that is actually used.

In this case, even if $F_\alpha(p)$ is checked by spending a hundred years, the number of $F_\alpha(p)$ that can be checked is merely approximately $3 \times 10^{19}$. Accordingly, the probability of the eavesdropper obtaining K is very small, namely $10^{19}/10^{33}=10^{-14}$.

As described above, K is obtained as a shared random number by using a radio star. An eavesdropper can not obtain K unless he/she can obtain all of the followings.

(a) radio star to be used
(b) observation time
(c) radio signal received by one sharing apparatus
(d) radio signal received by the other sharing apparatus
(e) arrival time difference between the two radio signals Particularly, a radio signal from a radio star has a very wide frequency bandwidth ranging from several ten to several hundred GHz. Therefore, it is extremely difficult for an eavesdropper to keep storing information for continuously monitoring random numbers.

Accordingly, the above-described codec system can be said to be safe.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A random number sequence sharing system comprising a plurality of random number sequence sharing apparatuses, wherein each random number sequence sharing apparatus comprises:
   a reception unit which receives a radio signal including a radio wave radiated from a pre-designated radio star, at a pre-designated observation time;
   a sending unit which sends the received radio signal to another random number sequence sharing apparatus;
   an acceptance unit which accepts a radio signal sent from said another random number sequence sharing apparatus;
   an analysis unit which separates the received radio signal and the accepted radio signal into a plurality of independent components according to independent component analysis;
   a selection unit which selects from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;
   a sampling unit which bit-samples an average of a component obtained by delaying one of the two selected independent component that is temporally anterior by the arrival time difference and the selected independent component that is temporally posterior, with a predetermined precision; and
   an output unit which outputs a sequence of bit samples obtained by the bit-sampling, as a random number sequence to be shared with said another random number sequence sharing apparatus.

2. The random number sequence sharing system according to claim 1, wherein each of said plurality of random number sequence sharing apparatuses further comprises a time difference obtaining unit which obtains the arrival time difference based on locations at which the plurality of random number sequence sharing apparatuses are installed, a location of the pre-designated radio star, and the pre-designated observation time.

3. A codec system having a coding apparatus and a decoding apparatus which share a sampling rule with each other, wherein
   each of said coding apparatus and said decoding apparatus includes a random number sequence sharing apparatus which constitutes said random number sequence sharing system according to claim 1,
   (a) said coding apparatus comprises:
   a key generation unit which selects a number sequence from a random number sequence output from said random number sequence sharing apparatus included in said coding apparatus according to said sampling rule, and uses the selected number sequence as a Vernam enciphering key;
   an acceptance unit which accepts information to be transmitted to said decoding apparatus;
   a coding unit which codes the accepted information according to a Vernam enciphering manner by using the generated Vernam enciphering key; and
   a sending unit which sends the coded information to said decoding apparatus,
   (b) said decoding apparatus comprises:
   a key generation unit which selects a number sequence from a random number sequence output from said random number sequence sharing apparatus included in said decoding apparatus according to said sampling rule, and uses the selected number sequence as a Vernam enciphering key;
   a reception unit which receives the coded information sent from said coding apparatus;
   a decoding unit which decodes the received information according to a Vernam deciphering manner by using the generated Vernam enciphering key; and
   an output unit which outputs the decoded information as information transmitted from said coding apparatus, and
   (c) said random number sequence sharing apparatus included in said coding apparatus and said random number sequence sharing apparatus included in said decoding apparatus constitute said random number sequence sharing system according to claim 1.

4. The codec system according to claim 3, wherein each of said coding apparatus and said decoding apparatus further comprises a rule acceptance unit which accepts an input of a sampling rule to be shared.

5. A random number sequence sharing system comprising a plurality of random number sequence sharing apparatuses, wherein each random number sequence sharing apparatus comprises:
   a reception unit which receives a radio signal including a radio wave radiated from a pre-designated radio star, at a pre-designated observation time;
   a sending unit which sends the received radio signal to another random number sequence sharing apparatus;
   an acceptance unit which accepts a radio signal sent from said another random number sequence sharing apparatus;
   an analysis unit which separates the received radio signal and the accepted radio signal into a plurality of independent components according to independent component analysis;
   a selection unit which selects from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;
   a sampling unit which bit-samples "one of the two selected independent components that is temporally anterior" with a predetermined precision; and
   an output unit which outputs a sequence of bit samples obtained by the bit-sampling, as a random number sequence to be shared with said another random number sequence sharing apparatus.

6. A random number sequence sharing system comprising a plurality of random number sequence sharing apparatuses, wherein each random number sequence sharing apparatus comprises:
   a reception unit which receives a radio signal including a radio wave radiated from a pre-designated radio star, at a pre-designated observation time;
   a sending unit which sends the received radio signal to another random number sequence sharing apparatus;
   an acceptance unit which accepts a radio signal sent from said another random number sequence sharing apparatus;

an analysis unit which separates the received radio signal and the accepted radio signal into a plurality of independent components according to independent component analysis;

a selection unit which selects from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;

a sampling unit which bit-samples "one of the two selected independent components that is temporally posterior" with a predetermined precision; and an output unit which outputs a sequence of bit samples obtained by the bit-sampling, as a random number sequence to be shared with said another random number sequence sharing apparatus.

7. A random number sequence sharing apparatus in said random number sequence sharing system according to claim 1 comprising:

a reception unit which receives a radio signal including a radio wave radiated from a pre-designated radio star, at a pre-designated observation time;

a sending unit which sends the received radio signal to another random number sequence sharing apparatus;

an acceptance unit which accepts a radio signal sent from said another random number sequence sharing apparatus;

an analysis unit which separates the received radio signal and the accepted radio signal into a plurality of independent components according to independent component analysis;

a selection unit which selects from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;

a sampling unit which bit-samples an average of a component obtained by delaying one of the two selected independent component that is temporally anterior by the arrival time difference and the selected independent component that is temporally posterior, with a predetermined precision; and an output unit which outputs a sequence of bit samples obtained by the bit-sampling, as a random number sequence to be shared with said another random number sequence sharing apparatus.

8. A coding apparatus in said codec system according to claim 3 comprising:

a random number sequence sharing system comprising:

a reception unit which receives a radio signal including a radio wave radiated from a pre-designated radio star, at a pre-designated observation time;

a sending unit which sends the received radio signal to another random number sequence sharing apparatus;

an acceptance unit which accepts a radio signal sent from said another random number sequence sharing apparatus;

an analysis unit which separates the received radio signal and the accepted radio signal into a plurality of independent components according to independent component analysis;

a selection unit which selects from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;

a sampling unit which bit samples an average of a component obtained by delaying one of the two selected independent component that is temporally anterior by the arrival time difference and the selected independent component that is temporally posterior, with a predetermined precision; and an output unit which outputs a sequence of bit samples obtained by the bit-sampling, as a random number sequence to be shared with said another random number sequence sharing apparatus;

a key generation unit which selects a number sequence from a random number sequence output from said random number sequence sharing apparatus according to said sampling rule, and uses the selected number sequence as a Vernam enciphering key;

an acceptance unit which accepts information to be transmitted to a decoding apparatus;

a coding unit which codes the accepted information according to a Vernam enciphering manner by using the generated Vernam enciphering key; and a sending unit which sends the coded information to said decoding apparatus.

9. A decoding apparatus comprising:

a random number sequence sharing system comprising, a reception unit which receives a radio signal including a radio wave radiated from a pre-designated radio star, at a pre-designated observation time;

a sending unit which sends the received radio signal to another random number sequence sharing apparatus;

an acceptance unit which accepts a radio signal sent from said another random number sequence sharing apparatus;

an analysis unit which separates the received radio signal and the accepted radio signal into a plurality of independent components according to independent component analysis;

a selection unit which selects from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;

a sampling unit which bit-samples an average of a component obtained by delaying one of the two selected independent component that is temporally anterior by the arrival time difference and the selected independent component that is temporally posterior, with a predetermined precision; and an output unit which outputs a sequence of bit samples obtained by the bit-sampling, as a random number sequence to be shared with said another random number sequence sharing apparatus;

a key generation unit which selects a number sequence from a random number sequence output from said random number sequence sharing apparatus according to said sampling rule, and uses the selected number sequence as a Vernam enciphering key;

a reception unit which receives the coded information sent from a coding apparatus;

a decoding unit which decodes the received information according to a Vernam deciphering manner by using the generated Vernam enciphering key; and an output unit which outputs the decoded information as information transmitted from said coding apparatus.

10. A random number sequence sharing method comprising:

a receiving step of receiving by a random number sequence sharing apparatus, a radio signal including a radio wave radiated from a pre-designated radio star, at a pre-designated observation time;

a sending step of sending the received radio signal to another random number sequence sharing apparatus;

an accepting step of accepting a radio signal sent from said another random number sequence sharing apparatus;

an analyzing step of separating the received radio signal and the accepted radio signal into a plurality of independent components according to independent component analysis;

a selecting step of selecting from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;

a sampling step of bit-sampling an average of a component obtained by delaying one of the two selected independent component that is temporally anterior by the arrival time difference and the selected independent component that is temporally posterior, with a predetermined precision; and an outputting step of outputting a sequence of bit samples obtained by the bit-sampling, as a random number sequence to be shared with said another random number sequence sharing apparatus.

11. The random number sequence sharing method according to claim 10, further comprising a time difference obtaining step of obtaining the arrival time difference based on a location at which said another random number sequence sharing apparatus is installed, a location of the pre-designated radio star, and the pre-designated observation time.

12. A coding method comprising:

a key generating step of selecting according to a sampling rule, a number sequence from a random number sequence output in accordance with said random number sequence sharing method according to claim 10, and using the selected number sequence as a Vernam enciphering key;

an accepting step of accepting information to be transmitted to a decoding apparatus;

a coding step of coding the accepted information according to a Vernam enciphering manner by using the generated Vernam enciphering key; and a sending step of sending the coded information to the decoding apparatus.

13. The coding method according to claim 12, further comprising a rule accepting step of accepting an input of a sampling rule to be shared.

14. A decoding method comprising:

a key generating step of selecting according to a sampling rule, a number sequence from a random number sequence output in accordance with said random number sequence sharing method according to claim 10, and using the selected number sequence as a Vernam enciphering key;

a receiving step of receiving coded information sent from a coding apparatus;

a decoding step of decoding the received information according to a Vernam deciphering manner by using the generated Vernam enciphering key; and an outputting step of outputting the decoded information as information transmitted from the coding apparatus.

15. The decoding method according to claim 14, further comprising a rule accepting step of accepting an input of a sampling rule to be shared.

16. A random number sequence sharing method comprising:

a receiving step of receiving by a random number sequence sharing apparatus, a radio signal including a radio wave radiated from a pre-designated radio star, at a pre-designated observation time;

a sending step of sending the received radio signal to another random number sequence sharing apparatus;

an accepting step of accepting a radio signal sent from said another random number sequence sharing apparatus;

an analyzing step of separating the received radio signal and the accepted radio signal into a plurality of independent components according to independent component analysis;

a selecting step of selecting from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;

a sampling step of bit-sampling "one of the two selected independent components that is temporally anterior" with a predetermined precision; and an outputting step of outputting a sequence of bit samples obtained by the bit-sampling, as a random number sequence to be shared with said another random number sequence sharing apparatus.

17. A random number sequence sharing method comprising:

a receiving step of receiving by a random number sequence sharing apparatus, a radio signal including a radio wave radiated from a pre-designated radio star, at a pre-designated observation time;

a sending step of sending the received radio signal to another random number sequence sharing apparatus;

an accepting step of accepting a radio signal sent from said another random number sequence sharing apparatus;

an analyzing step of separating the received radio signal and the accepted radio signal into a plurality of independent components according to independent component analysis;

a selecting step of selecting from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;

a sampling step of bit-sampling "one of the two selected independent components that is temporally posterior" with a predetermined precision; and an outputting step of outputting a sequence of bit samples obtained by the bit-sampling, as a random number sequence to be shared with said another random number sequence sharing apparatus.

18. A program product comprising:
a computer readable storage medium having code stored thereon configured to direct a processor of a host computer to function as a random sequence sharing apparatus, the code comprising instructions to:
receive a radio signal including a radio wave radiated from a pre-designated radio star, at a pre-designated observation time;
send the received radio signal to another random number sequence sharing apparatus;
accept a radio signal sent from said another random number sequence sharing apparatus;
separate the received radio signal and the accepted radio signal into a plurality of independent components according to independent component analysis;
select from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus;
bit-sample an average of a component obtained by delaying one of the two selected independent component that is temporally anterior by the arrival time difference and the selected independent component that is temporally posterior, with a predetermined precision; and
output a sequence of bit samples obtained by the bit-sampling, as a random number sequence to be shared with said another random number sequence sharing apparatus.

19. A program product comprising:
a computer readable storage medium having code stored thereon configured to direct a processor of a host computer to function as a coding apparatus, the code comprising instructions to:
cause the processor to function as a random number sequence sharing system by,
  receiving a radio signal including a radio wave radiated from a pre-designated radio star, at a pre-designated observation time,
  sending the received radio signal to another random number sequence sharing apparatus,
  accepting a radio signal sent from said another random number sequence sharing apparatus,
  separating the received radio signal and the accepted radio signal into a plurality of independent components according to independent component analysis,
  selecting from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus,
  bit-sampling an average of a component obtained by delaying one of the two selected independent component that is temporally anterior by the arrival time difference and the selected independent component that is temporally posterior, with a predetermined precision, and
  outputting a sequence of bit samples obtained by the bit-sampling, as a random number sequence to be shared with said another random number sequence sharing apparatus;
cause the processor to function as a key generation unit by selecting a number sequence from a random number sequence output from said random number sequence sharing apparatus according to said sampling rule, and uses the selected number sequence as a Vernam enciphering key;
cause the processor to function as an acceptance unit accepting information to be transmitted to a decoding apparatus;
cause the processor to function as a coding unit coding the accepted information according to a Vernam enciphering manner by using the generated Vernam enciphering key; and
cause the processor to function as a sending unit sending the coded information to said decoding apparatus.

20. A program product comprising:
a computer readable storage medium having code stored thereon configured to direct a processor of a host computer to function as a decoding apparatus, the code comprising instructions to:
cause the processor to function as a random number sequence sharing system by,
  receiving a radio signal including a radio wave radiated from a pre-designated radio star, at a pre-designated observation time,
  sending the received radio signal to another random number sequence sharing apparatus,
  accepting a radio signal sent from said another random number sequence sharing apparatus,
  separating the received radio signal and the accepted radio signal into a plurality of independent components according to independent component analysis,
  selecting from the plurality of independent components obtained by the independent component analysis, two independent components which are temporally different from each other by an arrival time difference between an arrival time it takes for the radio wave radiated from the radio star to arrive at said random number sequence sharing apparatus and an arrival time it takes for the radio wave to arrive at said another random number sequence sharing apparatus,
  bit-sampling an average of a component obtained by delaying one of the two selected independent component that is temporally anterior by the arrival time difference and the selected independent component that is temporally posterior, with a predetermined precision, and outputting a sequence of bit samples obtained by the bit-sampling, as a random number sequence to be shared with said another random number sequence sharing apparatus;

cause the processor to function as a key generation unit selecting a number sequence from a random number sequence output from said random number sequence sharing apparatus according to said sampling rule, and uses the selected number sequence as a Vernam enciphering key;

cause the processor to function as an acceptance unit accepting information to be transmitted to a decoding apparatus;

cause the processor to function as a coding unit coding the accepted information according to a Vernam enciphering manner by using the generated Vernam enciphering key; and cause the processor to function as a sending unit sending the coded information to said decoding apparatus.

* * * * *